United States Patent [19]

Harris

[11] Patent Number: 4,465,748

[45] Date of Patent: Aug. 14, 1984

[54] GLASS FIBRE PAPER SEPARATOR FOR ELECTROCHEMICAL CELLS

[75] Inventor: Frank J. T. Harris, Cheltenham, England

[73] Assignee: Evans Adlard & Company Limited, Gloucestershire, Great Britain

[21] Appl. No.: 486,566

[22] Filed: Apr. 20, 1983

[30] Foreign Application Priority Data

Apr. 20, 1982 [GB] United Kingdom ................. 8211419

[51] Int. Cl.$^3$ ............................................ H01M 10/06
[52] U.S. Cl. ..................................... 429/247; 429/204
[58] Field of Search ................................ 429/247, 204

[56] References Cited

U.S. PATENT DOCUMENTS

| | | | |
|---|---|---|---|
| 2,578,534 | 12/1951 | Giles et al. | 429/247 |
| 2,734,095 | 2/1956 | Mears et al. | 429/252 |
| 3,085,126 | 4/1963 | Labino | 429/247 |
| 3,328,142 | 6/1967 | Levecque | 429/252 |
| 3,862,861 | 1/1975 | McClelland et al. | 429/247 |
| 4,216,280 | 8/1980 | Kono et al. | 429/247 |
| 4,221,846 | 9/1980 | Armstrong et al. | 429/247 |
| 4,233,379 | 11/1980 | Gross et al. | 429/247 |
| 4,262,068 | 4/1981 | Kono | 429/247 |

*Primary Examiner*—John F. Niebling

[57] ABSTRACT

A separator suitable for electrochemical cells of the lead-acid recombinant type comprises a sheet of entangled glass fibres. It has been found that significant improvements in performance can be obtained when 5 to 35% by weight of the fibres have a diameter of less than 1 μm. It has also been found surprisingly advantageous if the overall solubility of the glass fibres is greater than 3% and preferably at least 4%, by weight in 5 hours at 85° C. in sulphuric acid of specific gravity 1.200. It has been found that further benefits can accrue if all or a major proportion of the fibres cover a continuous range of fibre diameters and fibre lengths, and preferably a minor proportion of the fibres being over 5 mm in length.

9 Claims, No Drawings

GLASS FIBRE PAPER SEPARATOR FOR ELECTROCHEMICAL CELLS

This invention relates to porous separators for electrochemical cells.

The use of paper as a separator between the plates of an electrochemical cell of, for example, the lead-acid type is well known. These cells were originally filled with dilute sulphuric acid, i.e. flooded, whereas more recently rechargeable maintenance-free normally sealed lead-acid cells have been disclosed, wherein the total amount of electrolyte is limited as in GB No. 1364283. In these lead-acid cells substantially all the electrolyte is absorbed within the pores of the separator and only a small proportion is present in the plates, there being no free unabsorbed electrolyte in the battery, at least when it is in the fully charged condition.

These starved cells are operated in their recombinant mode, i.e. gas recombination is used to eliminate maintenance during use, and they operate under superatmospheric pressure. Owing to the restricted amount of electrolyte, the high electrolyte absorbency of the separator and the higher electrochemical efficiency of the negative electrode, the cell operates under the so-called "oxygen cycle". Thus oxygen generated during charging or overcharging is transported, it is believed, through the gas phase in the separator to the surface of the negative electrode which is damp with sulphuric acid, and there recombines with the lead to form lead oxide, which in turn is converted to lead sulphate by the sulphuric acid. Loss of water is thus avoided, as is excess gas pressure within the cell.

The prior art has been particularly concerned to avoid "leading-through" that is to say, the production of "lead dendrites" through the separator between the positive and negative plates and the need for a small pore size has been taught. Also in the prior art the need for extreme acid resistance has been generally accepted.

Contrary to these previously held views, it has now been found that extreme acid resistance is not necessarily desirable, and furthermore it is possible for there to be too large a proportion of fine glass fibres in a separator for this type of limited electrolyte cell. One must take account of the rate of absorbency of the separators, the size of the pores in the paper, and also the distribution of the absorbed electrolyte between the separators and the plates. Using suitable fibres it is possible to produce papers which have both a high rate of absorbency and also the ability to absorb a relatively large quantity of the electrolyte, e.g. sulphuric acid with a S.G. of 1.280. It is preferred to use a paper, such that, when it is compressed to the thickness that the separator will have in the battery, the electrolyte will wick up to a height of 200 mm in 60 minutes or quicker, and also after 60 minutes virtually all the pore spaces will have filled with electrolyte, or at least to the extent of 90% of all the pore spaces. This absorbency then means that if the battery designer knows the quantities of electrolyte which are needed in the battery, this can be provided by selecting a suitable thickness of separator, bearing in mind of course that this also affects some of the other properties of the battery.

In one aspect of the present invention there is provided a glass fibre paper for use as a separator in electrochemical cells, characterised in that the proportion of fibres less than 1 $\mu$m in diameter is in the range of 5 to 35% by weight, and preferably in the range 10 to 20% by weight. In general the proportion of such fine fibres required decreases with the grammage of the paper. For papers of less than 100 gsm (grams per square meter) the proportion of such fibres can be in the range 30–35% by weight. For papers of 200 gsm or more the proportion can be in the range of 5–20%, most preferably 10–20% by weight.

In another aspect of the present invention a glass fibre paper for use as a separator for electrochemical cells is characterised in that at least a major proportion of the fibres are of a continuous range of fibre diameters and lengths (rather than a few selected dimensions), and not more than a minor proportion of the fibres are over 5 mm in length. This enables a more uniform paper to be manufactured, with more consistent battery properties. Thin separators are less resistant to dendrite growth and leading through than thick separators. To reduce the risk with thinner separators, it is necessary to use on average finer fibres, but as noted above in the present invention the proportion of fine fibres is reduced as the paper is made at higher grammages and hence thicker. Quite apart from the economics, the rate of absorbency is improved. It is preferred to vary the fibre diameter so that on average any line through the thickness of the paper at right angles to its surface will intercept at least 25, and preferably 30 equivalent fibre diameters, up to maybe 70 or even 80 equivalent fibre diameters, but beyond this point further increase appears to be undesirable. (The number of equivalent fibre diameters is arrived at by adding up all the distance within the fibres traversed by the line and dividing this by the average fibre diameter).

Thus, whereas the prior art would call for the use of 50–95% by weight of fibres having a diameter smaller than 1 $\mu$m as taught in U.S. Pat. No. 4,216,280, it has been found that the proportion by weight of such fibres may be much less than this. Moreover, the proportion of fibres which are over 5 $\mu$m in diameter may be as low as 5% as taught in U.S. Pat. No. 4,216,280 but considerably greater in papers with a higher grammage, up to 50%, or even 60%.

This departure from the previous teaching permits greater rate of absorbency of electrolyte, and by optimising the plate spacing, and hence compression of the separator, the amount of electrolyte retained by the separator can be increased, thereby increasing the capacity of the battery. Again, contrary to previous teaching, it has been found that there is no need in a limited electrolyte recombinant cell to maintain the very small pores previously thought necessary, and pores even as large as 50 $\mu$m do not cause leading through on overcharge, which in this type of cell is in any case more likely to occur in the discharged state. With particular reference to SLI batteries, for starting, lighting and ignition in automobiles the ability to provide a high starting current for short periods can be enhanced.

It is well known in the art that sulphuric acid for use in lead acid batteries must be of particularly high standard with regard to metallic impurities. The glass fibres which may be used in the separator are somewhat soluble in sulphuric acid, and it is therefore necessary to select a glass composition which can be turned into fibres and also in service will not release an unacceptably large quantity of metallic ions, such as for example manganese, into the sulphuric acid. In the prior art it has been considered that the fibres should not be soluble in the sulphuric acid to more than a minimal extent. For example, Japanese Standard JIS C 2202 teaches that no more than 0.6% of fibres should be soluble in 5 hours at 85° C. in acid of S.G. 1.200. Contrary to this teaching we find that fibres which have a solubility of 3%, preferably at least 4%, or even 6% or more under these conditions produce a separator material which has better absorbency, better electrolyte retention, and at the same time a satisfactory performance in the electrochemical cell. A further aspect of the present invention therefore provides a glass fibre paper for use as a separator in a lead-acid recombinant electrochemical cell, in which the solubility of the fibres in acid of S.G. 1.200 at 85° C. over a period of 5 hours exceeds 3% by weight. Preferably the overall solubility of the fibres is at least 4% by weight, and possibly at least 6% by weight. With particular reference to SLI batteries, for starting, lighting and ignition in automobiles the ability to resist abuse and cycling problems can be enhanced.

EXAMPLE 1

Blown glass fibre was produced by the flame attenuation process, giving a range of fibre diameters and lengths. Fibre of this kind was made up into two samples of non-woven glass fibre paper, with the following characteristics.

|  | Sample I | Sample II |
|---|---|---|
| Grammage (g/m$^2$) | 53 | 263 |
| Fibres less than 1 μm diameter, % by weight | 33 | 12 |
| Fibres over 5 μm diameter, % by weight | 4 | 51 |
| Thickness in mm when measured at a pressure of 10 kN/m$^2$ | 0.39 | 1.9 |
| Number of equivalent fibre diameters intercepted | 33 | 69 |
| Acid solubility % | 4.6 | 4.2 |
| Time to 200 mm, min | 46 | 31 |
| % pores filled | 93 | 94 |
| Maximum pore diameter, μm | 19 | 23 |

The samples were successfully tested in lead-acid cells of the limited electrolyte recombinant type.

EXAMPLE 2

A series of small sealed, limited electrolyte cells were constructed for test purposes. The plates, all from one source, were of uniform size and pasting. The construction and formation of the cells was kept as uniform as possible.

Two types of paper made according to the prior art were compared with three variations made according to the present invention. The prior art papers had a solubility in sulphuric acid of less than 3%, and had between 60 and 90% of fibres less than 1 μm in diameter, whereas the three papers of the present invention had a solubility in sulphuric acid of 4 to 5% and from 15 to 20% of fibres less than 1 μm in diameter.

The high rate performance of the fully formed cells was tested by discharging them individually through a 0.5 ohm resistor until the terminal voltage had fallen to 1.0 volt. The first of the two old types performed for 170 seconds, whilst the other lasted 180 seconds and yielded 734 Joules of energy. The three variations of the separator of the present invention lasted 390, 350 and 420 seconds, yielding 1838, 1527 and 2080 Joules respectively.

EXAMPLE 3

Similar test cells were constructed, using three reference papers (B, L and Y), and the same three papers (1, 2 and 3) as used in Example 2. The cells were formed and subjected to cyclic abuse. During discharge, the rate of discharge was held at 200 mA, whilst the charging rate was 60 mA. The capacity of the cell when discharged to a terminal voltage of 1.7 volt was recorded.

The comparison between the materials is shown in the table. The papers 1, 2 and 3, having acid solubility and fine fibre percentages in the preferred range, had consistently good performance. Paper B, which had a fine fibre percentage within our preferred range but low acid solubility, had a performance inferior to the preferred papers 1, 2 and 3, but better than papers L and Y which had both low acid solubility and fine fibre percentages just outside the range for the present invention.

| Papers | Acid Solubility | % fibres <1 μm diameter | Pore Size | Capacity to 1.7 Volt, in mAh after unit of life | | | | | |
|---|---|---|---|---|---|---|---|---|---|
| | | | | 1 | 2 | 3 | 4 | 5 | 6 |
| B | <2% | ca. 18% | ca. 23 μm | 360 | 780 | 720 | 640 | 520 | 340 |
| L | <2% | 2 to 3% | ca. 30–35 μm | 600 | nil | | | | |
| Y | ca. 2.6% | 36% | ca. 15–16 μm | 800 | 380 | 470 | nil | | |
| new 1 | 4 to 5% | 15 to 20% | ca. 23–26 μm | 880 | 900 | 930 | 930 | 900 | 1080 |
| 2 | 4 to 5% | 15 to 20% | ca. 23–26 μm | 790 | 790 | 850 | 810 | 910 | 1090 |
| 3 | 4 to 5% | 15 to 20% | ca. 23–26 μm | 900 | 930 | 1010 | 970 | 760 | 1140 |

I claim:

1. A separator suitable for electrochemical cells of the lead-acid recombinant type, comprising a sheet of entangled glass fibres, wherein between 5 and 35% by weight of the fibres have a diameter of less than 1 μm.

2. A separator according to claim 1 wherein between 10% and 20% by weight of the fibres have a diameter of less than 1 μm.

3. A separator suitable for electrochemical cells of the lead-acid recombinant type, comprising a sheet of entangled glass fibres, wherein the overall solubility of the fibres is greater than 3% by weight in 5 hours at 85° C. in sulphuric acid of specific gravity 1.22 and less than 50% by weight of the fibres have a diameter of less than 1 μm.

4. A separator according to claim 3 wherein the overall solubility of the fibres is at least 4% by weight.

5. A separator suitable for electrochemical cells of the lead-acid recombinant type, comprising a sheet of entangled glass fibres, wherein all or a major proportion of the fibres cover a continuous range of fibre diameters and fibre lengths and less than 50% by weight of the fibres have a diameter of less than 1 μm.

6. A separator according to claim 5 wherein not more than a minor proportion of the fibres are over 5 mm in length.

7. In an electrochemical cell of the lead-acid recombinant type, incorporating a separator of entangled glass fibres, the improvement wherein less than 50% by weight of the fibres have a diameter of less than 1 μm.

8. In an electrochemical cell of the lead-acid recombinant type, which incorporates a separator comprising a sheet of entangled glass fibres, the improvement wherein the overall solubility of the fibres is greater than 3% by weight in 5 hours at 85° C. in sulphuric acid of specific gravity 1.200 and less than 50% by weight of the fibres have a diameter of less than 1 μm.

9. In an electrochemical cell of the lead-acid recombinant type, incorporating a separator comprising a sheet of entangled glass fibres, the improvement wherein less than 50% of the fibres have a diameter of less than 1 μm, and the separator has the property that the acid electrolyte will wick upwards at a rate corresponding to a height of 200 mm in 60 minutes or less, and filling at least 90% of the pore spaces in the separator.

* * * * *